(12) United States Patent
Angell et al.

(10) Patent No.: US 6,520,654 B2
(45) Date of Patent: Feb. 18, 2003

(54) THIN PANEL LIT CLUSTER

(75) Inventors: Daniel K. Angell, Allen Park, MI (US); Don A. Kees, Essex (GB); Paul S. Ewers, Essex (GB); Thomas L. Jones, Ann Arbor, MI (US); Michael J. Luettgen, Bloomfield Hills, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/751,779

(22) Filed: Dec. 29, 2000

(65) Prior Publication Data

US 2002/0085366 A1 Jul. 4, 2002

(51) Int. Cl.[7] ............................................... G01D 11/28

(52) U.S. Cl. ............................. 362/23; 362/29; 362/31; 362/482; 362/488; 362/489; 362/546; 116/DIG. 36

(58) Field of Search ............................. 362/23, 29, 30, 362/31, 85, 482, 488, 489, 26; 40/546; 116/DIG. 36, DIG. 286, DIG. 288

(56) References Cited

U.S. PATENT DOCUMENTS

| | | | | |
|---|---|---|---|---|
| 4,991,064 A | * | 2/1991 | Clem | 116/286 |
| 5,741,058 A | * | 4/1998 | Suzuki et al. | 362/23 |
| 6,025,820 A | * | 2/2000 | Salmon et al. | 116/286 |

* cited by examiner

Primary Examiner—Stephen Husar
Assistant Examiner—Bertrand Zeade
(74) Attorney, Agent, or Firm—Brinks Hofer Gilson & Lione

(57) ABSTRACT

A thin panel lit cluster including a graphics appliqué with a first and second side and at least one opaque section and one translucent section. A light-carrying panel with a first and second side is positioned such that the first side is adjacent to the second side of the graphics appliqué. The light-carrying panel has at least one opening defined in it and at least one light source is positioned to align with the opening. Opposite the light source, the light-carrying panel has a first light-redirecting area nearest its first side. In another position on the light-carrying panel, there is a second light-redirecting area nearest the second side of the light-carrying panel and opposite a translucent section of the graphics appliqué.

50 Claims, 7 Drawing Sheets

THIN PANEL LIT CLUSTER

FIELD OF THE INVENTION

This invention relates generally to the field of instrument panels. In particular, this invention relates to a thin-lit panel construction designed for providing general illumination for the instrument panel of an automobile.

DESCRIPTION OF THE RELATED ART

In today's motor vehicles, it is necessary to provide a well-lit instrument cluster such that the operator can quickly scan the requisite gauges and view the information needed without taking his or her eyes off of the road for an extended period of time. The light source must be clear and bright, yet not bright enough to affect the night vision of the operator. It must also provide a uniform level of light to the instrument panel. It is also desirable to have an instrument panel that is as thin as possible in order to save space in the design of the dashboard of the vehicle.

In the past, large, incandescent light sources were used to provide light to the instrument panel These light sources were placed directly behind the gauges that needed illumination. However, these large light sources caused the package size of the instrument panel to be quite bulky and large. Furthermore, the sources also consumed much power and gave off an undesirable amount of heat. Moreover, the sources had relatively short life spans and required frequent replacement due to burnout. In order to reduce the thickness of the panel, designers began to use light emitting diodes (LEDs) that are much smaller, use less power, have much longer lifetimes and give off less heat. However, LEDs produce light in very localized areas, and it became necessary to diffuse the light in order to produce useful illumination for a relatively large area such as an instrument panel.

U.S. Pat. No. 5,695,269 proposes the use of LEDs aligned on the edge of a light pipe to backlight an instrument panel. The light from the LEDs is transmitted into a light pipe upon which a sheet of prismatic material having defined grooves is mounted. These grooves must be precisely measured and formed in order to redirect the light from the LEDs out through the instrument panel. This produces a well-lit instrument panel without giving off too much heat or using too much power. This design also allows the use of different colored LEDs to provide different colors of light to certain sections of the instrument panel. However, a disadvantage of this device is that the prismatic material must be adhered to the light pipe, adding to the thickness of the package. Additionally, the cost of producing such an instrument panel is increased because of the extra design and machining costs of the prismatic material and its grooves due to their complexity.

U.S. Pat. No. 6,036,328 discloses a plane-shaped lighting device with a high light-incidence efficiency as well as a very thin profile. This device places a light source at the edge of a light-directing plate. The light from the light source is transmitted through the light-directing plate and reflected off of a light-reflecting plate adhered to one surface of the light-directing plate. The light-reflecting plate redirects the light out of the light-directing plate and illuminates the instrument panel. The disclosed embodiment of this device uses an array of LEDs placed at the edge of the plate. Because the LEDs are placed at the edge of the plate, the designer must account for this extra space on the thin sides of the instrument panel. This can lead to design difficulties. The fact that the light-reflecting plate extends across the entire light-directing plate necessitates the array of LEDs due to diffusion of the light. Since there is a large reflective area, more light is needed to provide enough illumination. The extra layer added by the light-reflecting plate also adds to the thickness of the package. It is desirable to even further increase the light efficiency as well as decrease the thickness of the package.

BRIEF SUMMARY OF THE INVENTION

In one embodiment a thin panel lit cluster includes a graphics appliqué with a first and second side and at least one opaque section and one translucent section. A light-carrying panel with a first and second side is positioned such that the first side is adjacent to the second side of the graphics appliqué. The light-carrying panel has at least one opening defined in it and at least one light source is positioned to align with the opening. Opposite the light source, the light-carrying panel has a first light-redirecting area nearest its first side. In another position on the light-carrying panel, there is a second light-redirecting area nearest the second side of the light-carrying panel and opposite a translucent section of the graphics appliqué.

In another embodiment, a thin panel lit cluster includes a graphics appliqué with a first side and a second side and at least one opaque section and at least one translucent section. A light-carrying panel with a first side and a second side is positioned such that the first side is adjacent to the second side of the graphics appliqué. The light-carrying panel has at least one opening defined in it and at least one light source is positioned to align with the opening. Opposite the light source, the light-carrying panel has a first light-redirecting area nearest its first side. In another position on the light-carrying panel is an area of light-absorbing material positioned such that light is transmitted through the light-absorbing material and out thorough the translucent sections of the graphics appliqué.

In another embodiment, a method for providing general illumination to an instrument panel is provided. The method includes the steps of providing a light-carrying panel with a first and second side as well as at least one opening, positioning a graphics appliqué with at least one translucent section adjacent to the first side of the light-carrying panel and aligning at least one, light source with the opening on the light-carrying panel. The light-carrying panel also has a first light-redirecting area on its first side and a second light-redirecting area on another side. Light is transmitted from the light source into the light-carrying panel through the opening and through the light-carrying panel to the second light-redirecting area and out through at least one translucent section of the graphics appliqué.

In yet another embodiment, a method for providing illumination to an instrument panel is provided. The method includes the steps of providing a light-carrying panel with at least one opening defined in it for light to enter and at least one area defined in it for light to exit and at least one light source substantially aligned with the entrance opening. Light is directed into the entrance opening and into the light-carrying panel. The light is redirected out of the light-carrying panel through the exit area.

DETAILED DESCRIPTION OF THE INVENTION

Figure 1:
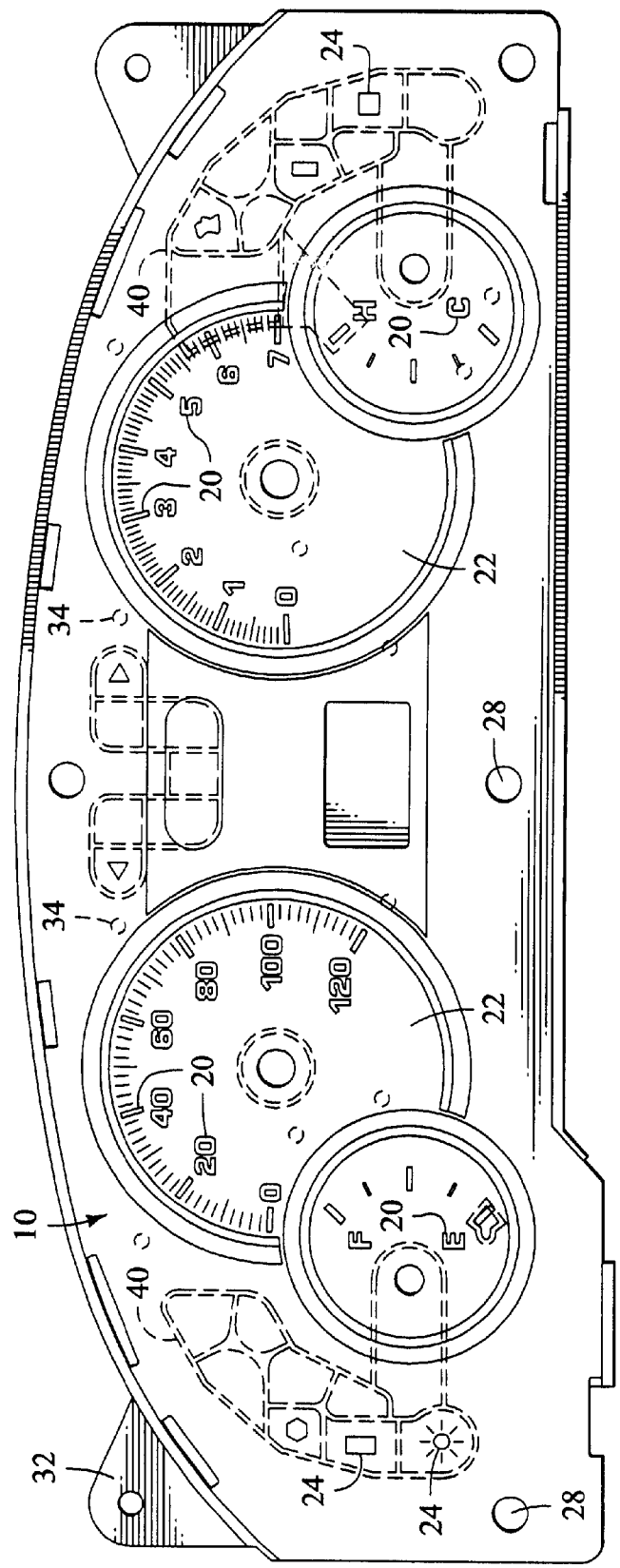
FIG. 1 shows an operator's view of an embodiment of the present invention.
Figure 2:
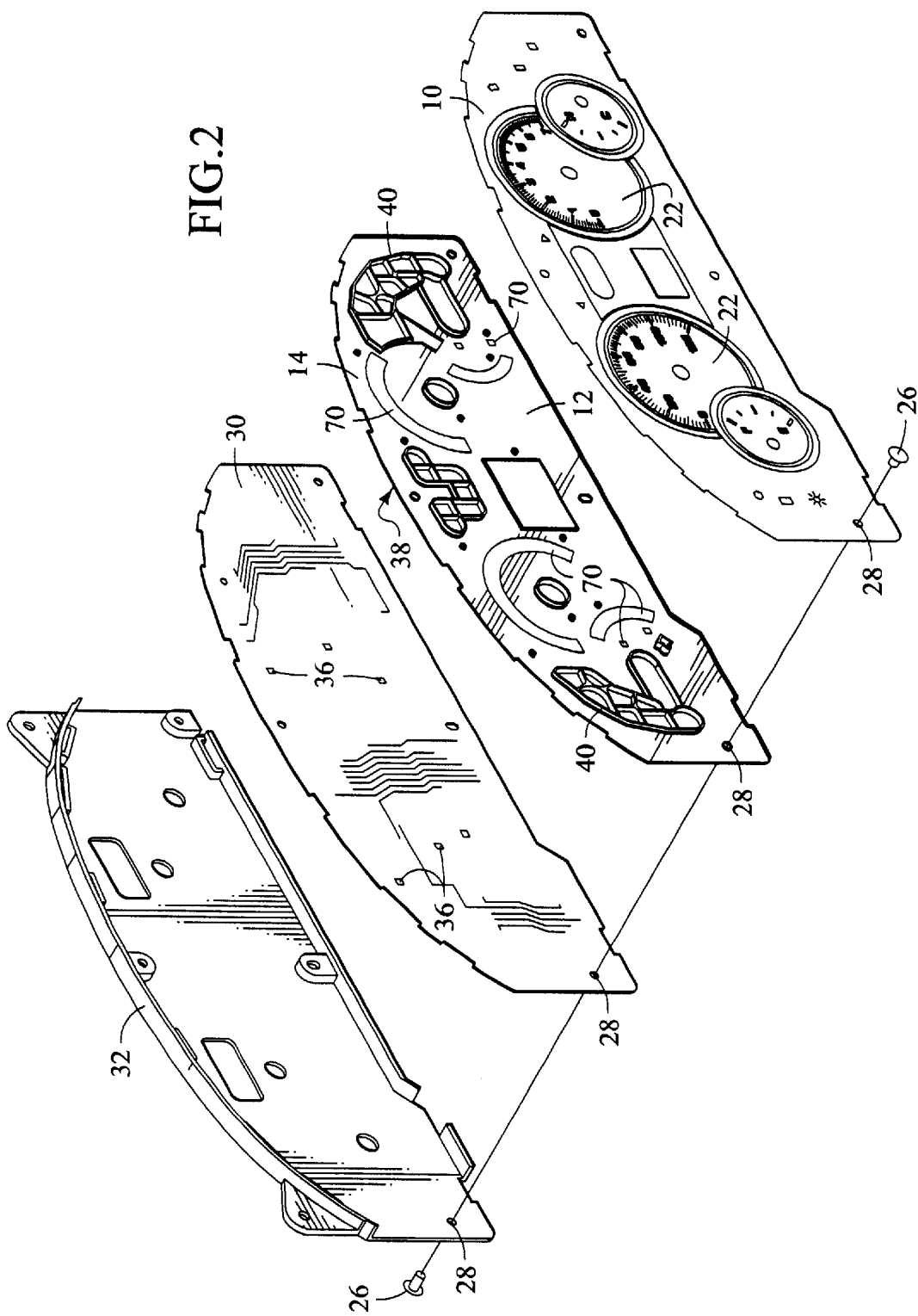
FIG. 2 shows an exploded view of an embodiment of the present invention.
Figure 3:
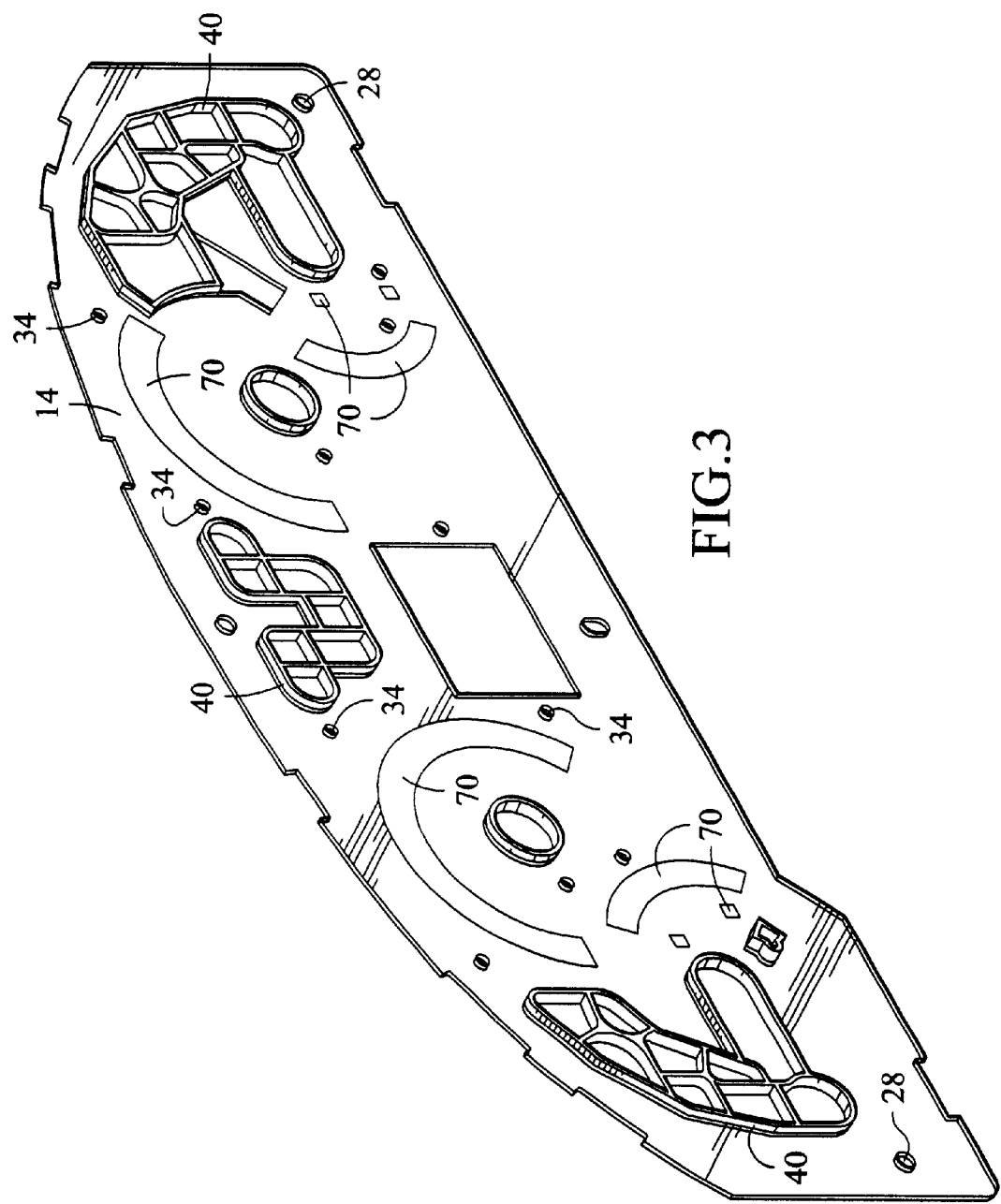
FIG. 3 shows a perspective view of the light-carrying panel of the embodiment from FIG. 2.

A preferred embodiment of a light-carrying panel 14 of the present invention is shown in FIGS. 1–3. As shown, a graphics appliqué 10 is preferably attached to a first side 12 of a light-carrying panel 14. The graphics appliqué 10 has opaque sections 16 through which light cannot pass and translucent sections 18 that allow light to pass. The translucent sections 18 of the graphics appliqué 10 preferably correspond to visual effects 20 or indications such as hatch marks, numbers or letters for gauges 22 on the graphics appliqué 10. The visual effects 20 are preferably in a position such that the operator of the vehicle can clearly see them when they are illuminated. In the preferred embodiment, the thin panel instrument cluster can be adapted to provide what is known as "general illumination," or illumination that is always present in the background. When the operator turns on the interior lights of the vehicle, the general illumination is turned on and remains on constantly. This is in contrast to warning lights 24 that are turned on and off according to signals received from the vehicle. This invention can be adapted to provide variable illumination for warning lights 24, but the preferable embodiment and the embodiment shown in the Figures provides general illumination.

The graphics appliqué 10 can be attached using numerous methods. As shown in the Figures, the graphics. appliqué 10 is attached to the light-carrying panel 14 using interlocking connectors 26 inserted though holes 28 in the graphics appliqué 10, light-carrying panel 14, the printed circuit board 30 and the mounting plate 32. The graphics appliqué 10 could also be secured to the light-carrying panel 14 using an adhesive. The light-carrying panel 14 is preferably made from elongated and continuous sheet stock plastic. This allows for simplified and more efficient manufacture, as the designer can simply cut the light-carrying panel 14 from a large piece of sheet stock to any size and shape. The material used for the light-carrying panel 14 is preferably very conducive to light transmission, flat, thin and colorless, although light-conducting materials that contain colors could be used. Some examples of preferable materials for the light-carrying panel 14 are polymethylmethacrylate and polycarbonate.

The light-carrying panel 14 also defines a number of openings 34 for receiving light from light sources 36 that are preferably located behind the light-carrying panel 14. As the preferred embodiment of the invention utilizes LEDs as light sources 36, for purposes of this detailed description and references to the Figures, the terms light sources 36 and LEDs are used interchangeably and are both referred to in the Figures as 36. The light sources 36 could also be sub-miniature incandescent light bulbs. By using such small efficient light sources 36, the invention is able to produce a brighter, more uniform pattern of illumination on the instrument panel. The openings 34 receive light into the light-carrying panel 14. The openings 34 initiate from the second side 38 of the light-carrying panel 14 and terminate before the first side 12 of the light-carrying panel 14 in the preferred embodiment. In another embodiment of the invention, the openings 34 are open on both the first 12 and second 38 sides, and a material on the back of the graphics appliqué 10 is used to redirect light back into the light-carrying panel 14. In order to maintain the highest degree of efficiency, it is preferable to include some type of light redirecting surface on the side of the opening 34 opposite the light source 36. This assures that the highest amount of light is transmitted into the light-carrying panel 14 as possible. The size and shape of the openings 34 are also dependent on the type of material that is used for the light-carrying panel 14. The color of the light source 36 should also be taken into account as well as the desired brightness of the instrument panel illumination.

Preferably, the thickness of the light-carrying panel 14 should be optimized to match the characteristics of the light source 36. In order for the design to operate at its highest efficiency, a number of light source 36 characteristics must be taken into account. The designer preferably will analyze the angular distribution characteristics of the light source 36 and the wavelength of the light emitted from the light source 36. Other values that must be examined when optimizing the design are the size of the openings 34 as well as the method of redirecting light into the light-carrying panel 14.

Preferably, a printed circuit board 30 is located on the second side 38 of the light-carrying panel 14 opposite the graphics appliqué 10. Preferably, at least one light source 36 is located on the surface of the circuit board 30 between the circuit board 30 and the light-carrying panel 14. There can be any number of light sources 36, depending on the amount and type of light needed. Each light source 36 is preferably aligned with and centered within an opening 34 in the light-carrying panel 14 and is electrically connected to the circuit board 30. Each light source 36 should be positioned to direct its light substantially into an opening 34 in the light-carrying panel 14. The light sources 36 are preferably LEDs and can be any number of colors. Preferably, the LEDs 36 are all of the same color, although different colors of LEDs 36 could be used in the same instrument panel. If different colored LEDs 36 are used in the same instrument panel, slots (not shown) are preferably defined into the light-carrying panel 14 and a light-blocking barrier 40, such as a closed-cell foam gasket, is partially inserted into the slots to keep the different colors of light from interfering with one another.

Figure 10:
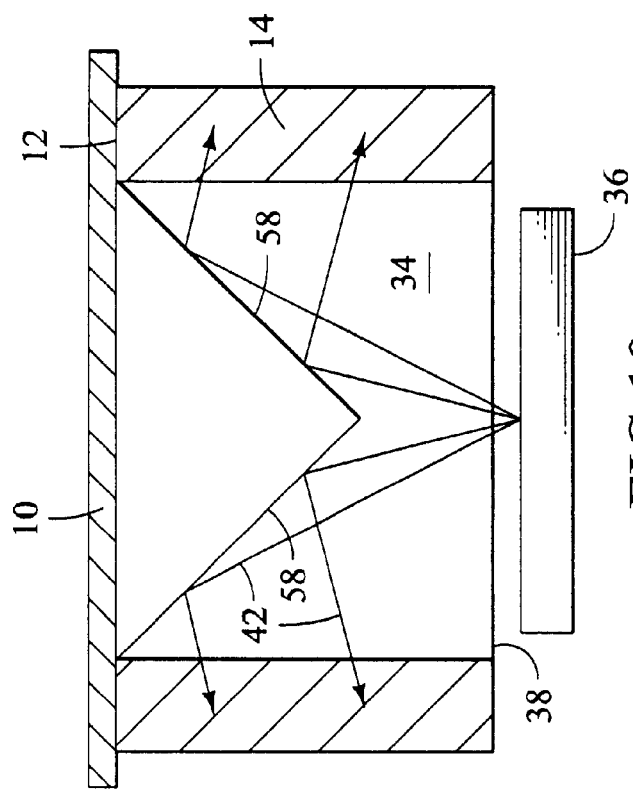
FIG. 10 shows a cross-sectional view of an embodiment of the present invention utilizing refractive surface injection molded into the light-carrying panel.
Figure 11:
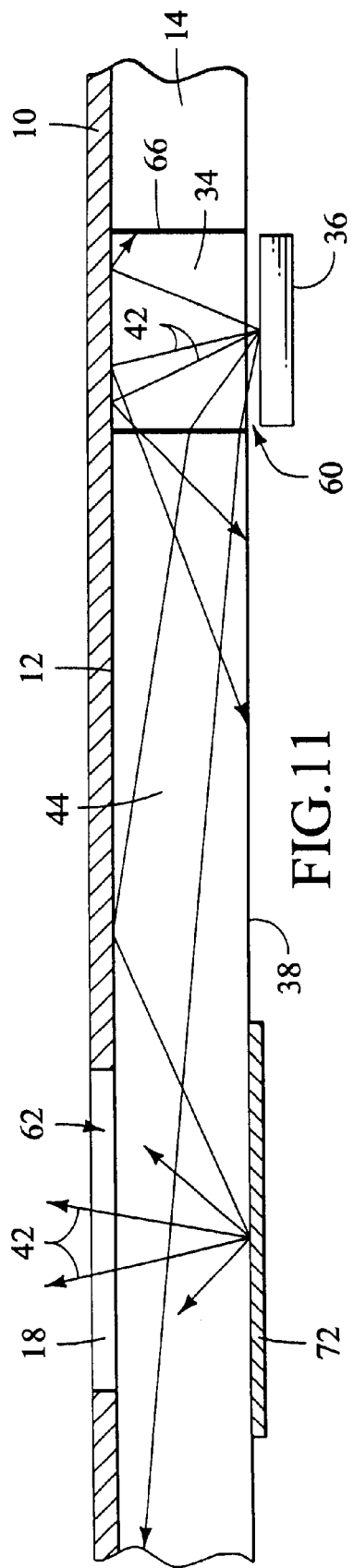
FIG. 11 shows a cross-sectional view of an embodiment of the present invention utilizing a transmissive scattering material.

Referring to FIGS. 4–11, for maximum efficiency, it is desirable to redirect some of the light 42 from the light source 36 back into the light-carrying panel 14 from the first side 12 of the light-carrying panel 14. Much of the light 42 from the light source 36 travels directly into the light-carrying panel 14 and is transmitted across the face 44 of the light-carrying panel 14 towards a light-redirecting surface 46 that redirects the light 42 out through the graphics appliqué 10. FIG. 11 shows the full path of the light 42 generally through the light-carrying panel 14. However, some light 42 travels in a substantially straight path from the light source 36 and impacts the first side 12 of the light-carrying panel 14. The following designs redirect some of this light 42 back into the light-carrying panel 14. These designs provide for more efficient transmission of the light 42 supplied by the light source 36.

Figure 7:
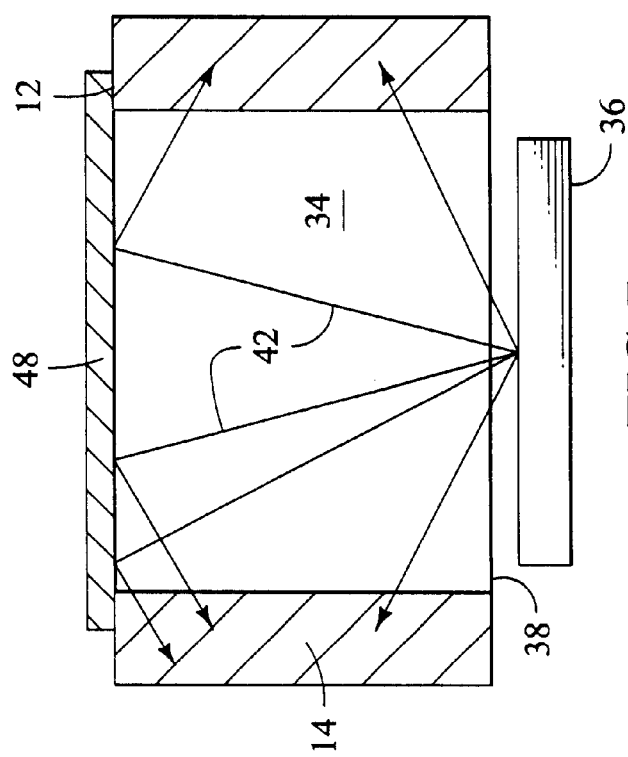
FIG. 7 shows a cross-sectional view of an embodiment of the present invention utilizing a diffusing surface.

As shown in FIG. 7, one embodiment of the invention uses a Lambertian diffusing surface 48 on the surface of the graphics appliqué 10 nearest the first side 12 of the light-carrying panel 14. Preferably, a light-scattering white paint 48 is silk-screened onto this surface of the graphics appliqué 10. The light scattering paint 48 redirects some of the impacting light 42 back into the light-carrying panel 14.

Figure 8:
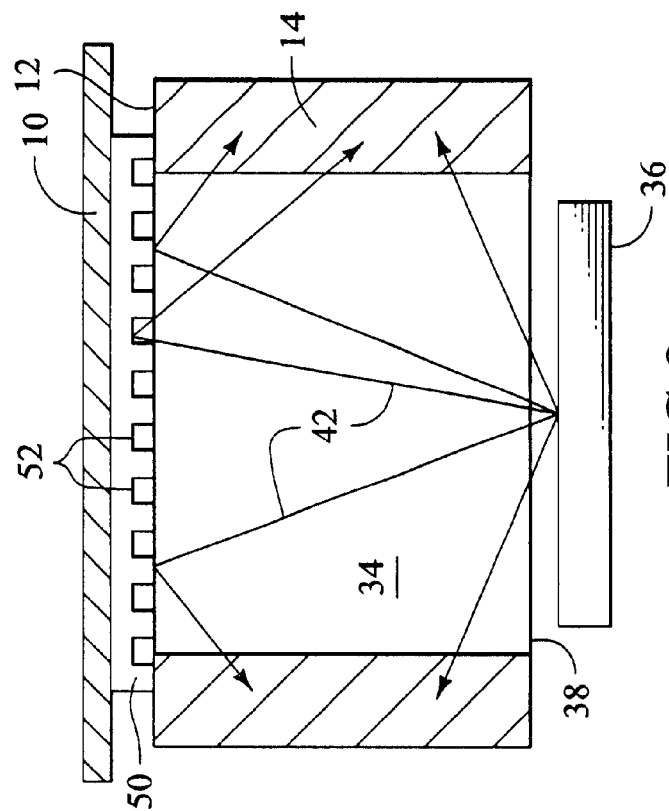
FIG. 8 shows a cross-sectional view of an embodiment of the present invention utilizing a holographic element.

As shown in FIG. 8, another embodiment of the invention utilizes a diffractive holographic element 50 placed on the surface of the graphics appliqué 10 nearest the first side 12 of the light-carrying panel 14. This diffractive element 50 is preferably a holographic sticker, which is inexpensive and simple to produce. The grooves 52 in the holographic sticker 50 act to redirect some of the impacting light 42 back into the light-carrying panel 14.

Figure 9:
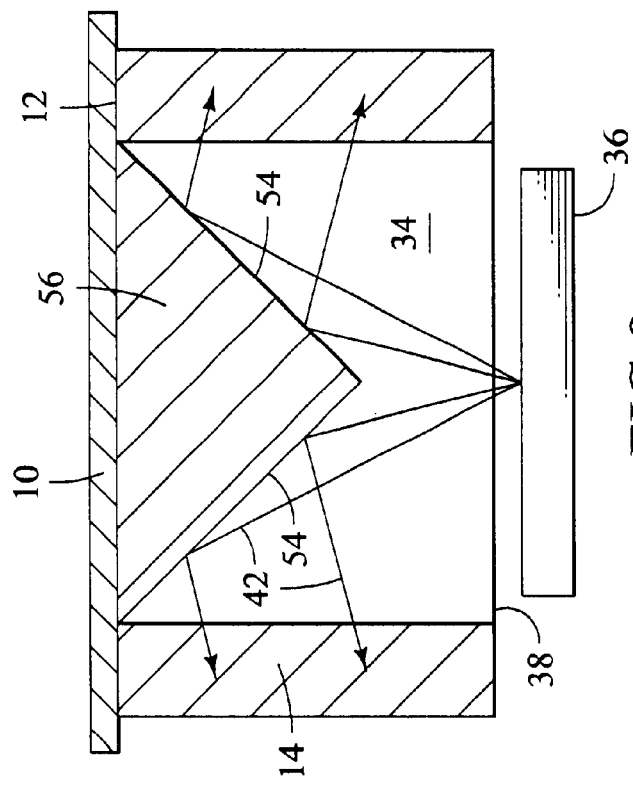
FIG. 9 shows a cross-sectional view of an embodiment of the present invention utilizing reflective surfaces pressed into the light-carrying panel.

As shown in FIG. 9, yet another embodiment of the invention uses reflective surfaces 54 to redirect light 42 back into the light-carrying panel 14. The preferable method is to press shapes 56 into the first side 12 of the light-carrying panel 14. In this design, the opening 34 is not open on the first side 12 of the light-carrying panel 14. The opening 34 is only defined in the second side 38 of the light-carrying panel 14. As shown in the FIG. 9, these shapes 56 form reflective surfaces 54 that redirect some of the light 42 back into the light-carrying panel. This design requires accurate alignment of the light source 36 for maximum efficiency.

As shown in FIG. 10, in yet another embodiment of the invention, a refractive surface 58 is used to redirect light 42 back into the light-carrying panel 14. The preferable method of forming the light-carrying panel 14 in this embodiment is to injection mold the light-carrying panel 14 rather than cutting it from a large piece of sheet stock. Pressure molding allows the designer to shape the light-carrying panel 14 such that surfaces 58 are angled towards the light source 36. These surfaces 58 act to redirect some of the light 42 back into the light-carrying panel. This design requires accurate alignment of the light source 36 for maximum efficiency.

Factors such as the type of material used for the light-carrying panel 14, the type of light-redirecting surface utilized to redirect light into the light-carrying panel 14 and the type and color of light source 36 must, be taken into account when optimizing the design. The following is intended to be an example of preferable optimization measurements of the opening 34 in the light-carrying panel 14 resulting from a combination of analytical and numerical techniques to maximize the input and output of light in the design. For example, an amber colored LED with an emission wavelength of 0.59 microns, a half-power angular bandwidth of 60 degrees, with an emitting surface 1.05 mm from a 3.175 mm thick acrylic light-carrying panel having a nominal refractive index of 1.497 has an optimized opening radius of 1.9 mm.

It should be noted that the preferable method of optimization is to optimize the radius of the opening 34 to match the characteristics of the light source 36. This is the most cost-effective method as it allows the use of commercially available light sources 36 and there is no need to specially manufacture a light source 36 having an optimized lens and other optimized characteristics. However, it is possible to optimize a light source 36 to an opening 34 in the light-carrying panel 14 of a specific radius.

Figure 4:
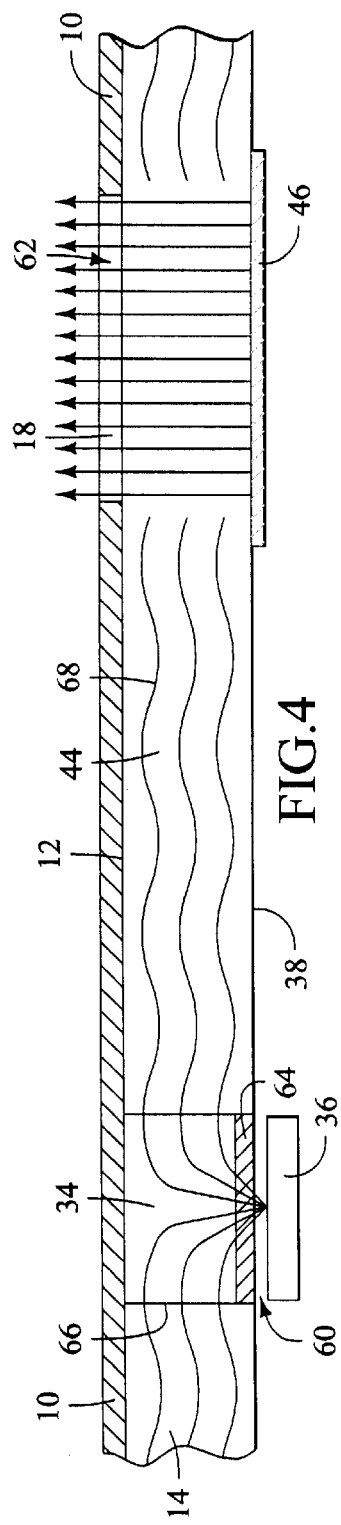
FIG. 4 shows a cross-sectional view of an embodiment of the light-carrying panel of the present invention.
Figure 5:
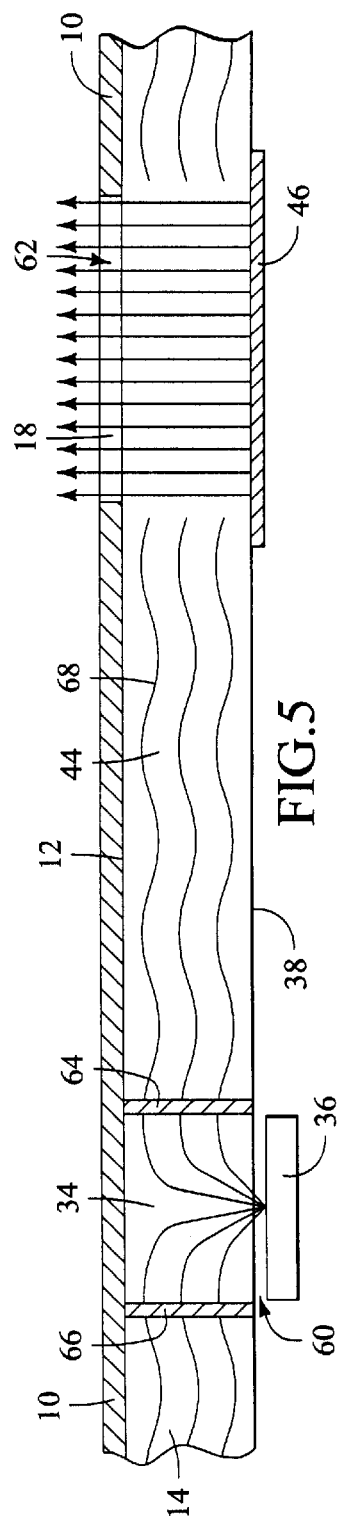
FIG. 5 shows a cross-sectional view of another embodiment of the light-carrying panel of the present invention.
Figure 6:
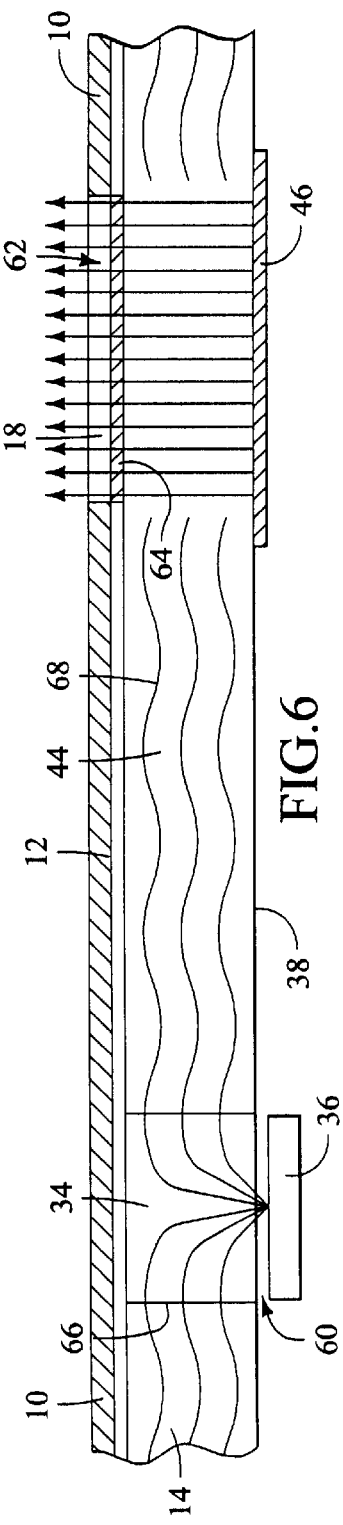
FIG. 6 shows a cross-sectional view of yet another embodiment of the light-carrying panel of the present invention.

Referring to FIGS. 4–6, methods of producing varying colors of output illumination using this invention are shown. Varying light sources can be used in combination with filters and fluorescent materials to accomplish this. One example would be to use a white light source 36 such as a sub-miniature light bulb or an LED 36 and filter the light from the source either at the entrance 60 or the exit 62 of the light-carrying panel 14. The filter 64 could be placed in a number of different positions, such as the outer diameter 66 of the opening 34 into the light-carrying panel 14, over the opening 34 on the second side 38 of the light-carrying panel 14 or over the translucent sections 18 of the graphics appliqué 10. It should be noted that since a filter 64 eliminates photons from the waves of light 42, less light 42 is transmitted after the waves pass through the filter 64, cutting down on efficiency.

Another way to produce varying colors of light is to use fluorescent materials rather than filters. Fluorescent materials absorb photons of a shorter wavelength and re-emit them at a longer wavelength. This results in a different color without a loss of energy. An example of a preferred method of using a fluorescent material to accomplish this is to use a short wavelength source such as a blue LED and place a fluorescent material over the outer diameter of the opening into the light-carrying panel, over the entire opening to the light-carrying panel or over the entire exit aperture of the graphics appliqué. The locations of the fluorescent materials are analogous to the locations of the filters 64 in FIGS. 4–6. This is the preferred technique because the fluorescent material will not suffer from any loss of luminous efficiency.

Referring to FIGS. 2, 3 and 11, the light-carrying panel 14 should also have areas of light-redirecting material 70 on it to redirect light out of the light carrying panel 14 and through the translucent sections 18 of the graphics appliqué 10. Preferably, the material used is reflective, but light-absorbing or fluorescent material could be used as well, with the appropriate variations in positioning. If reflective material is used, the reflective material should be applied to the second side 38 of the light-carrying panel 14. The areas of reflective material 70 need not align exactly with the translucent sections 18 of the graphics appliqué 10, but they should substantially align with them. Wherever there is a translucent section 18 of the graphics appliqué 10, there is preferably an area of the light-carrying panel 14 directly between the translucent section 18 and the circuit board 30 with reflective material 70 applied to it. The preferred method is to put a band of the reflective material 70 on the light-carrying panel 14 behind each translucent section 18 as shown in FIGS. 2 and 3. It is important that the reflective material 70 is not simply applied to the entire light-carrying panel 14, as this will result in unnecessary diffusion of the light.

Preferably, the reflective material 70 should have the proper bi-directional reflectance distribution function ("BRDF"). It is,preferable to have a BRDF that is centered within the angular distribution of the light captured within the light-carrying panel 14. Preferably, the BRDF output characteristics should be isotropic, meaning that the material 70 is non-angle specific. However, the reflective material 70 can also be anisotropic, and depend on the angle at which the light hits it. A typical example of an isotropic diffuser is a highly loaded titanium oxide pigment ($TiO_2$), in an acrylic binder silk screened onto an acrylic light-carrying panel 14.

This example uses the diffusion method described previously and shown in FIG. 7 to redirect the light 42 out through the translucent sections 18 in the graphics appliqué 10. The binder should match the refractive index of the light-carrier material, so in this example, the light-carrying panel 14 should also be formed from acrylic. It is also possible to pattern the silk-screened material in order to compensate for irregularities in light transmission. Small dot patterns, for example, may be screened into the material to create a more uniform illumination of the graphics appliqué 10. Alternative methods, such as mechanical patterning of the acrylic with embossed or etched patterns, or mechanically molding reflective or refractive structures into the light-carrying panel 14, may also be used to redirect the light 42 out through the graphics appliqué. These methods are analogous to the methods described previously and shown in FIGS. 7–10 in reference to redirecting light through the light-carrying panel 14 to increase the light transmission efficiency.

If light-absorbing material is used, it can be placed on the first side 12 of the light-carrying panel 14, and aligned in the same manner as above. Light-absorbing material could also be applied directly to the side of the graphics appliqué 10 nearest the light-carrying panel 14 and on the translucent sections 18 of the graphics appliqué 10. The light-absorbing material should be able to transmit enough light in the general direction of the operator so that the panel is adequately illuminated. Typical acrylate-based dyes and pigments commonly found in plastic decorating or other substances known in the art may be used for this purpose.

If fluorescent materials are used, they are preferably placed on the first side 12 of the light-carrying panel 14 and aligned in the same manner as described above. Fluorescent materials can also be applied directly to the side of the graphics appliqué 10 nearest the light-carrying panel 14 and on the translucent sections 18 of the graphics appliqué 10. The fluorescent material should be able to transmit enough light in the direction of the operator so that the graphics appliqué 10 is adequately illuminated. A common example of a fluorescent material that converts green light from an LED to orange light is Rhodimine 6 G. An alternative, which converts short wave blue-to-blue light, would be a cumarin fluorescent dye.

Referring to FIG. 11, transmissive scattering materials provide another alternative to reflective materials and light-absorbing materials. This embodiment is preferred as it provides the highest efficiency of light transfer and is the easiest to manufacture. Transmissive scattering materials may be used with laser-cut sheet stock, molding or selective foil manufacturing. If transmissive scattering material 72 is used, it can be placed on the second side 38 of the light-carrying panel 14 as shown in FIG. 11, but it is preferably applied to the first side 12 of the light-carrying panel 14 in the same position as the materials in the other methods. Alternatively, it could be positioned directly on the side of the graphics appliqué 10 closest to the light-carrying panel 14. If applied to the graphics appliqué 10, the transmissive scattering material is preferably in close optical contact with the light-carrying panel 14. To achieve this, the transmissive scattering material can be combined with an adhesive having a similar refractive index as the light-carrying panel 14. This mixture of adhesive and transmissive scattering material can then be used to adhere the graphics appliqué 10 to the light-carrying panel 14. The transmissive scattering material 72 should have the proper angular distribution function, and it is preferable to have an output transmittance distribution function that is centered within the angular distribution of the light captured within the light-carrying panel 14.

The invention in its preferred embodiment provides illumination through the translucent sections 18 of the graphics appliqué 10. Light from the LEDs 36 is transmitted into the openings 34 in the light-carrying panel 14. The openings 34 in the light-carrying panel 14 act as light catchers and transmit the light emitted from the LEDs 36 across the body 44 of the light-carrying panel 14. As described previously, different types of reflecting or refracting means may be used to increase the efficiency of light transmission into the light-carrying panel 14. Referring to FIG. 11, when the light 42 reaches an area of reflective material 70, the reflective material 70 redirects the light 42 through the translucent sections 18 of the graphics appliqué 10. If light absorbing material is used, the light-absorbing material absorbs the light from the light-carrying panel 14 and transmits it through the translucent sections 18 of the graphics appliqué 10. If fluorescent material is used, light enters the material in one wavelength and leaves the material at another wavelength, without losing a significant amount of light. If transmissive scattering material is used, light is diffused through the material and out through the translucent sections 18 of the graphics appliqué 10. All of these methods give the same result, in that specific sections of gauges 22 and other lights on the instrument panel are illuminated in a manner that is both uniform and highly visible.

An advantage to this invention is that it provides a bright, uniform light to an entire instrument panel using a small number of light sources 36. This reduces the power needed, the cost of production and the cost of operating the instrument panel. The entire instrument panel can also remain very thin using this design. Plus, there is no need to add additional length to the sides of the light-carrying panel 14 with LED arrays located on the edge of the light-carrying panel 14. This feature allows designers more room to work with and can free up space that can be used for other features. Yet another advantage to this invention is the fact that since the light-carrying panel 14 may be made from sheet stock, it is very easy to produce. The manufacturer simply cuts the piece of sheet stock to the proper dimensions and cuts the necessary number of openings 34 to supply an adequate amount of light. Although in some embodiments some complex machining is necessary, in the preferred embodiment, there is no need to cut complex grooves or attach extra sheets of prismatic material in order to redirect the light in the desired direction.

It should be noted that there could be a wide range of changes to the claimed invention. As discussed above, many different types of material could be used as the light-carrying material. Different light sources could be used as well as different reflecting and refracting materials. Light-absorbing, fluorescent or transmissive scattering materials may be used in place of reflecting materials. Many different methods of increasing the efficiency of light transfer into the light-carrying panel 14 have been described. Thus, it is intended that the foregoing detailed description be regarded as illustrative rather than limiting and that it be understood that it is the following claims, including all equivalents, which are intended to define the scope of the invention.

What is claimed is:

1. A thin panel lit cluster comprising:

a graphics appliqué having a first side and a second side;

said graphics appliqué having at least one opaque section and at least one translucent section;

a light-carrying panel having a first side and a second side and positioned such that said first side is adjacent to said second side of said graphics appliqué;

at least one opening defined in said light-carrying panel;

at least one light source positioned to align with said opening;

at least one first light-redirecting area positioned nearest said first side of said light-carrying panel opposite said light source; and at least one second light-redirecting area positioned nearest said second side of said light-carrying panel opposite said translucent section on said graphics appliqué.

2. The thin panel lit cluster of claim 1, wherein the dimensions of said at least one opening are optimized according to the type and positioning of said light source.

3. The thin panel lit cluster of claim 2, wherein the dimensions of said at least one opening are optimized according to the type and positioning of said at least one first light-redirecting area.

4. The thin panel lit cluster of claim 3, wherein said at least one first light-redirecting area is an area of diffusing material applied to said second side of said graphics appliqué.

5. The thin panel lit cluster of claim 3, wherein said at least one first light-redirecting area is a holographic element applied to said second side of said graphics appliqué.

6. The thin panel lit cluster of claim 3, wherein said at least one first light-redirecting area is a reflective shape pressed into said first side of said light-carrying panel opposite said light source.

7. The thin panel lit cluster of claim 3, wherein said at least one first light-redirecting area is a refractive shape injection molded into said first side of said light-carrying panel opposite said light source.

8. The thin panel lit cluster of claim 1, wherein said graphics appliqué is positioned such that said first side of said graphics appliqué is visible by an operator.

9. The thin panel lit cluster of claim 8, further comprising, a printed circuit board located adjacent to said second side of said light-carrying panel.

10. The thin panel lit cluster of claim 9, wherein said light source is mounted on the surface of said printed circuit board.

11. The thin panel lit cluster of claim 10, wherein said light source is a light emitting diode.

12. The thin panel lit cluster of claim 10, wherein said second at least one light-redirecting area is substantially aligned with said at least one translucent section of said graphics appliqué.

13. The thin panel lit cluster of claim 12, wherein said at least one second light-redirecting area is an area of light-diffusing material.

14. The thin panel lit cluster of claim 13, wherein said at least one second light-redirecting area is a holographic element applied to said light-carrying panel.

15. The thin panel lit cluster of claim 9, wherein the largest surfaces of said light-carrying panel are smooth.

16. The thin panel lit cluster of claim 1, wherein there is a plurality of said openings defined upon said light-carrying panel.

17. The thin panel lit cluster of claim 16, wherein there is single light source aligned with each of said openings.

18. The thin panel lit cluster of claim 17, wherein each of said light sources is of a first color.

19. The thin panel lit cluster of claim 18, wherein at least one of said light sources is of a second color different from said first color.

20. The thin panel lit cluster of claim 18, wherein a layer of fluorescent material is applied to the outer diameter of said at least one opening.

21. The thin panel lit cluster of claim 18, wherein a layer of filtering material is applied to the outer diameter of said at least one opening.

22. A thin panel lit cluster comprising:

a graphics appliqué having a first side and a second side;

said graphics appliqué having at least one opaque section and at least one translucent section;

a light-carrying panel having a first side and a second side and positioned such that said first side is adjacent to said second side of said graphics appliqué;

at least one opening defined in said light-carrying panel;

at least one light source positioned to align with said opening; and at least one light-redirecting area positioned nearest said first side of said light-carrying panel opposite said light source; and at least one area of light-absorbing material positioned on said light-carrying panel such that light is transmitted through said translucent sections of said graphics appliqué.

23. The thin panel lit cluster of claim 22, wherein the dimensions of said at least one opening are optimized according to the type and positioning of said light source.

24. The thin panel lit cluster of claim 23, wherein the dimensions of said at least one opening are optimized according to the type and positioning of said at least one light-redirecting area.

25. The thin panel lit cluster of claim 24, wherein said at least one light-redirecting area is an area of light-diffusing material applied to said second side of said graphics appliqué.

26. The thin panel lit cluster of claim 24, wherein said at least one light-redirecting area is a holographic element applied to said second side of said graphics appliqué.

27. The thin panel lit cluster of claim 24, wherein said at least one light-redirecting area is a reflective shape pressed into said first side of said light-carrying panel opposite said light source.

28. The thin panel lit cluster of claim 24, wherein said at least one light-redirecting area is a refractive shape injection molded into said first side of said light-carrying panel opposite said light source.

29. The thin panel lit cluster of claim 22, wherein said graphics appliqué is positioned such that said first side of said graphics appliqué is visible by an operator.

30. The thin panel lit cluster of claim 29, further comprising a printed circuit board located adjacent to said second side of said light-carrying panel.

31. The thin panel lit cluster of claim 30, wherein said light source is mounted on the surface of said printed circuit board.

32. The thin panel lit cluster of claim 31, wherein said light source is a light emitting diode.

33. The thin panel lit cluster of claim 32, wherein said at least one area of light-absorbing material is substantially aligned with said at least one translucent section of said graphics appliqué.

34. The thin panel lit cluster of claim 33, wherein said at least one area of light-absorbing material is applied to said second side of said graphics appliqué.

35. The thin panel lit cluster of claim 33, wherein said at least one area of light-absorbing material is applied to said first side of said light-carrying panel adjacent to said graphics appliqué.

36. The thin panel lit cluster of claim 31, wherein the largest surfaces of said light-carrying panel are smooth.

37. The thin panel lit cluster of claim 22, wherein there is a plurality of said openings defined upon said light-carrying panel.

38. The thin panel lit cluster of claim 37, wherein there is single light source aligned with each of said openings.

39. The thin panel lit cluster of claim 38, wherein each of said light sources is of a first color.

40. The thin panel lit cluster of claim 39, wherein at least one of said light sources is of a second color different from said first color.

41. The thin panel lit cluster of claim 39, wherein a layer of fluorescent material is applied to the outer diameter of said at least one opening.

42. The thin panel lit cluster of claim 39, wherein a layer of filtering material is applied to the outer diameter of said at least one opening.

43. A method for providing general illumination to an instrument panel, said method comprising the steps of:

providing a light-carrying panel having a first side and a second side;

positioning a graphics appliqué on said first side of said light-carrying panel;

providing at least one translucent section in said graphics appliqué;

providing at least one opening defined in said light-carrying panel;

aligning at least one light source with said opening;

providing at least one first light-redirecting area on said first side of said light-carrying panel;

providing at least one second light-redirecting area on a second side of said light-carrying panel; and transmitting light from said at least one light source via said light-carrying panel to at least one second light-redirecting area and redirecting said light through said at least one translucent section of said graphics appliqué.

44. The method of claim 43, further comprising the step of optimizing the dimensions of said at least one opening according to the type of light source and type of light-redirecting material.

45. The method of claim 44, wherein the largest sides of said light-carrying panel are smooth.

46. The method of claim 45, wherein said second light-redirecting area is an area of light-reflecting material on said second side of said light-carrying panel.

47. The method of claim 45, wherein said second light-redirecting area is an area of light-absorbing material on said first side of said light-carrying panel.

48. The method of claim 45, wherein said second light-redirecting area is an area of light-transmissive scattering material on said second side of said light-carrying panel.

49. The method of claim 45, wherein said second lightredirecting area is an area of light-transmissive scattering material on said first side of said light-carrying panel.

50. A method for providing illumination to an instrument panel, said method comprising the steps of:

providing a light-carrying panel with at least one opening defined therein for light to enter, at least one area defined therein for light to exit and at least one light source substantially aligned with said entrance opening and at least a first and a second light-redirecting area defined on opposite sides of said light-carrying panel;

directing light from said light source into said entrance opening into said light-carrying panel and redirecting light out of said light-carrying panel out of said exit area.

* * * * *